United States Patent [19]
Stoy

[11] Patent Number: 5,322,243
[45] Date of Patent: Jun. 21, 1994

[54] SEPARATELY BANKING MANEUVERING AERODYNAMIC CONTROL SURFACES, SYSTEM AND METHOD

[75] Inventor: David R. Stoy, Woodland Hills, Calif.

[73] Assignee: Northrop Corporation, Los Angeles

[21] Appl. No.: 12,071

[22] Filed: Feb. 1, 1993

Related U.S. Application Data

[63] Continuation-in-part of Ser. No. 904,123, Jun. 25, 1992, abandoned.

[51] Int. Cl.$^5$ ................................................. B64C 9/06
[52] U.S. Cl. ................................. 244/45 A; 244/75 R; 244/90 R; 244/88; 244/89; 244/3.24
[58] Field of Search ................. 244/45 R, 45 A, 90 R, 244/88, 89, 120, 75 R, 324

[56] References Cited

U.S. PATENT DOCUMENTS

| | | | |
|---|---|---|---|
| 4,010,920 | 3/1977 | Farner | 244/45 A |
| 5,139,215 | 8/1992 | Peckham | 244/45 A |

*Primary Examiner*—Galen L. Barefoot
*Attorney, Agent, or Firm*—Terry J. Anderson; Robert B. Block; Karl J. Hoch, Jr.

[57] ABSTRACT

A maneuvering system for a flight vehicle rotates a lifting aerodynamic surface of the flight vehicle about an axis parallel with a direction of flight of the vehicle in a rotational direction corresponding to the desired change of flight direction to which the vehicle is to be steered, while maintaining attitude stability of the flight vehicle by altering other aerodynamic surfaces of the vehicle.

5 Claims, 4 Drawing Sheets

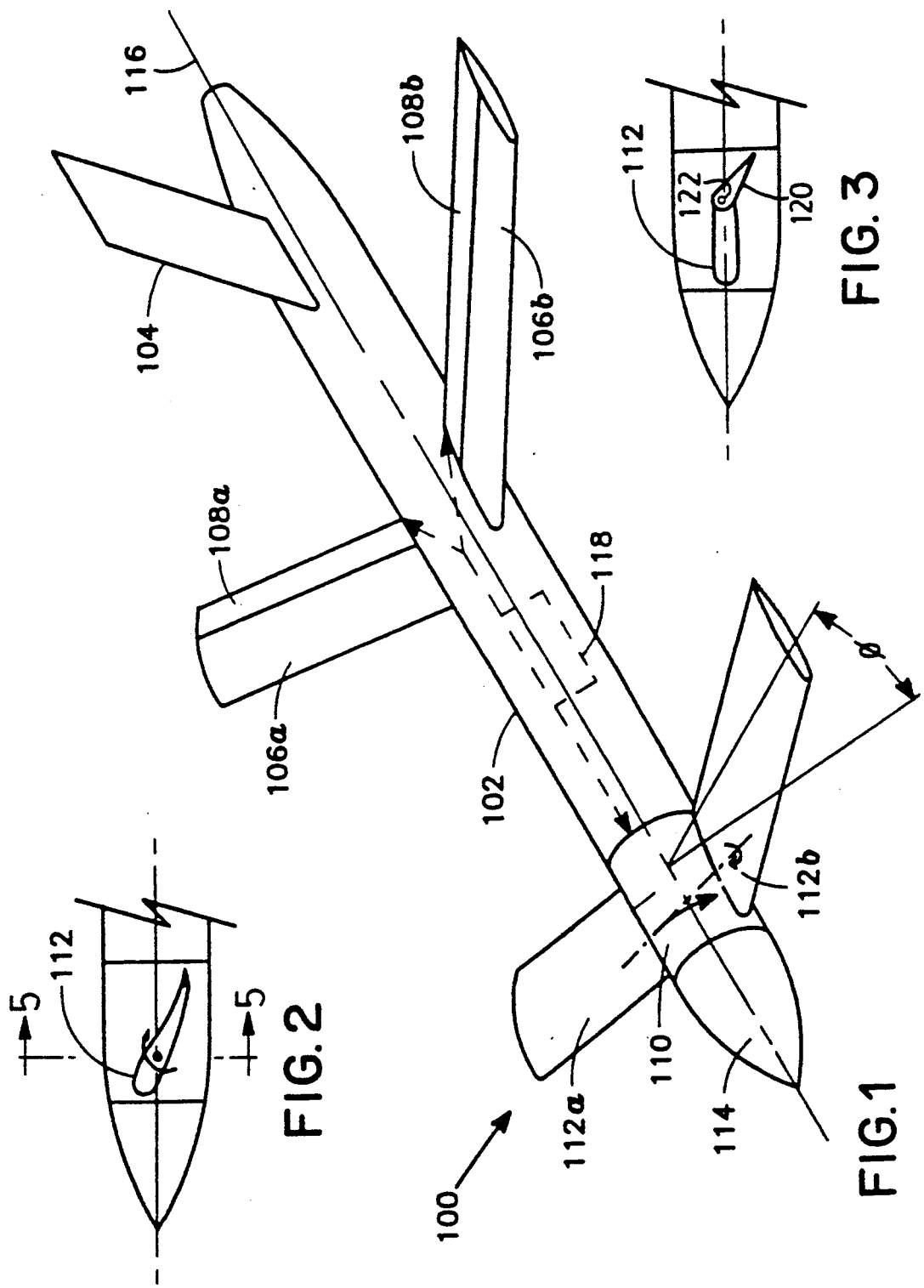

5,322,243

SEPARATELY BANKING MANEUVERING AERODYNAMIC CONTROL SURFACES, SYSTEM AND METHOD

CROSS REFERENCES TO RELATED APPLICATION

This application is a continuation-in-part of my prior application Ser. No. 07/904,123 filed Jun. 25, 1992, entitled Separately Banking Maneuvering Aerodymanic Control Surfaces now abandoned.

BACKGROUND OF THE INVENTION

TECHNICAL FIELD

The present invention relates to rapid maneuvering and control of a flight vehicle and particularly to use of forward control surfaces or canards for flight maneuvering and control.

BACKGROUND ART

Cruise missiles and guided bombs must be controlled continuously to impact. Increased flight path control power can provide improved miss distances and allow greater simplicity in terminal target sensors. A canard control surface is better suited to provide terminal control because the force it produces is initially in the direction of the target, as compared with tail controls, which produce an initial force away from the target in order to pitch the flight vehicle to produce a lift force in the desired direction. Until the terminal seeker acquires the target, the relative direction of any required terminal course correction is not determined. In previous applications, where severe terminal maneuvers were desired, four canard surfaces have been arranged in a cruciform pattern to be combined in a manner necessary to provide a force and pitching moment in the direction necessary. This has the disadvantage of requiring the vertical canard pair to be carried for the entire duration of the flight. Since the vertical surfaces are not required except in the terminal phase, they have the disadvantage of producing directional instability, added drag, and extra weight during the majority of the flight duration. This has a detrimental effect on range, and in the case of the cruise missile, cruise speed.

There is, therefore, a need for a maneuvering and control system which will overcome the above limitations and disadvantages.

SUMMARY OF THE INVENTION

The separately banking maneuvering control system of the present invention consists of a canard (horizontal control surface mounted forward of the vehicle center of gravity protruding from either side of the nose) mounted on a ring or nose section which is free to rotate about the flight vehicle roll axis, independent from the roll attitude of the vehicle (FIG. 1). In the primary design, the canard and mounting ring are free to rotate on a roller or bearing mechanism (FIG. 5). The relative attitude is controlled by means of differential deflection of the canard control surfaces. The angle of rotation is continually modulated through an active feedback control system. Vehicle flight condition data is fed to a flight computer from sensors such as gyroscopes, inertial measurement units (IMUs), air data sensors, accelerometers, or any other instruments designed to measure required flight parameters. This information is processed by the flight computer and combined with inputs of target relative position and range from the target sensors.

More specifically, the invention provides a steering system consisting of a pair of aerodynamic control surfaces protruding from opposite sides at one end of a flight vehicle (preferably the front end or nose) which are rotatable about the longitudinal axis of the vehicle so as to rapidly steer the vehicle to the left or right. During level flight when no moments are to be imparted to the vehicle, the total moments imparted by the pair of control surfaces and all other surfaces of the flight vehicle is zero. Generally, this means that the pair of control surfaces are horizontal and impart a vertical lift force which is in equilibrium with other forces acting on the vehicle. When it is desired to steer the flight vehicle to the left or right, the pair of control surfaces are rotated about the longitudinal vehicle axis through a suitable rotation angle. This rotates the lift vector of the pair of control surfaces to create or increase its horizontal component while reducing its vertical component as a function of the rotation angle. The direction of steering is determined by the direction of longitudinal rotation. In accordance with the invention, the decrease in the vertical lift component of the pair of control surfaces is compensated by simultaneously changing the incidence of the control surface in a direction to provide additional force. The incidence and rotation angles are controlled in a manner required to maintain longitudinal trim.

By eliminating the need for the vertical canard surfaces, the separately banking maneuvering control retains the advantage of the canard for terminal control while eliminating the weight and drag penalties.

In one embodiment of the invention, the pair of aerodynamic control surfaces are canard fins extending from opposite sides of the nose of the vehicle, and are parallel and horizontal during level flight. But, when steering the vehicle, the control surfaces are pitched slightly so as to provide lift, and are rotated together about the vehicle's longitudinal axis. In this configuration, the control surfaces provide a lift force having a component in the horizontal direction. This may be accomplished by rotating a section of the vehicle on which the control surfaces are mounted, which may be a nose section or other vehicle section. The resulting change in the vertical component of lift may be balanced by simultaneously actuating rear stabilizers if the vehicle has rear stabilizers. Preferably, however, the resulting change is balanced by modulating the incidence of the rotated control surfaces or, alternatively, by modulating trailing edge flaps on the control surfaces, to provide pitch trim in addition to the yawing moment provided by the longitudinal rotation of the vehicle section on which the control surfaces are mounted.

BRIEF DESCRIPTION OF THE DRAWINGS

FIG. 1 is a perspective view of a flight vehicle embodying the present invention and including control surfaces or fins on a freely rotatable section at the forward portion of the vehicle.

FIG. 2 is a side view corresponding to the forward portion of FIG. 1 illustrating one form of the control fins constructed in accordance with the present invention.

FIG. 3 is a side view corresponding to an alternative embodiment similar to FIG. 1 illustrating a different shape of a control fin constructed in accordance with the present invention.

DETAILED DESCRIPTION OF THE PREFERRED EMBODIMENTS

Figure 4:
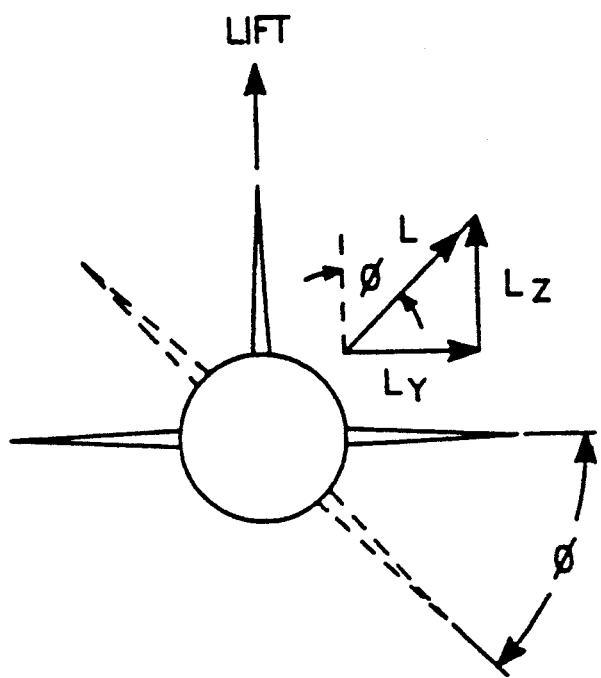
FIG. 4 is a diagram of the force vectors imparted by the aerodynamic control fins of FIG.'s 1 through 3.

Referring to FIG. 1, a maneuvering control system is provided for a flight vehicle 100 which extends fore and aft along a longitudinal axis about which the vehicle assumes a roll attitude. The flight vehicle 100, such as a missile or airplane, has a fuselage or main body 102 and conventional aerodynamic control surfaces located at the middle or rear of the craft, including a vertical stabilizer 104 and a pair of wings 106a, 106b having movable control surfaces or ailerons 108a, 108b.

Means is provided for forming control surfaces mounted from said section to extend outwardly therefrom along a lateral axes generally on opposite sides of said section.

The steering apparatus of the invention is comprised in a rotatable section 110 of the flight vehicle 100 on which is mounted a pair of control fins or canards 112a, 112b near the nose 114 of the vehicle 100.

Means is provided for forming a forward section of said vehicle which is free to rotate about said longitudinal axis independently of said roll attitude. Thus, the portion of the rotatable section 110 supporting the pair of control fins 112 is rotatable about the longitudinal axis 116 of the flight vehicle 100. The nose 114 may or may not be fixed to and rotate with the rotatable section 110. An internal control system 118 inside the flight vehicle 100 steers the vehicle by independently changing the attitude of said control surfaces about lateral axes to control the roll attitude of said section and to obtain a desired change in direction of flight. System 118 includes actuators connected to the control surfaces for changing the relative attitude of the control surfaces by differential deflection in which said surfaces move counter to each other, and by symmetrical deflection in which said surfaces move in the same direction, the attitudes of said surfaces being actuated independently so that differential deflection controls the rotation orientation of said section, and symmetrical deflection produces a pitching moment to the vehicle in the direction of the collective surface orientation.

Figure 5:
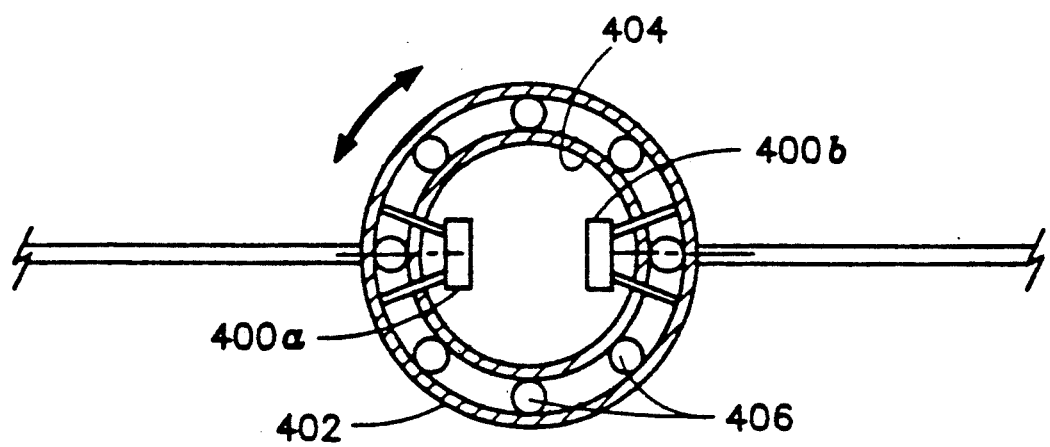
FIG. 5 is a cross-sectional view taken along the lines 5—5 of FIG. 2 illustrating actuation of the aerodynamic control fins of FIGS. 1-2.

An example of an implementation of the rotatable cylindrical section 110 and control surfaces is illustrated in FIG. 5. Thus, a pair of actuators 400a, 400b controlled by the control system 118 rotate the elevons 120 about a lateral axis as in the embodiment of FIG. 1, each actuator 400a, 400b rotating an elevon 120 or a respective one of the steering fins 112a, 112b independently of the other. The rotatable section 110 includes an outer ring 402 which freely rotates with respect to an inner ring 404 fastened to and stationary with the fuselage 102. Bearings 406 permit free rotation. Whenever it is desired to rotate the cylindrical section 110, the elevons 120 of the two steering fins 112a, 112b are rotated in opposite directions to create a rolling moment, thereby rotating the freely rotating outer ring 402. As soon as the desired rotation angle $\phi$ is reached, the elevons 120 are returned to their normal parallel alignment with the major surfaces of the steering fins 112. This feature may also be implemented in the embodiment of FIG. 2.

Preferably, the control fins 112 provide a trimming force perpendicular to the ground during level flight, as in the configuration of FIG. 1. They provide lift in one of several ways. In one embodiment, they each include an elevon 120 rotatable about the joint 122, as indicated in FIG. 3. In this embodiment, each elevon 120 is pitched about the joint 122 so as to provide lift, as illustrated in FIG. 4. In another embodiment, the entire control fin 112 is rotatable about a lateral horizontal axis of the vehicle, as illustrated in FIG. 2. Preferably, each of the control fins has an airfoil cross-sectional shape or profile, as illustrated in FIG. 2, although it may be a simple flat plate for some cruder applications.

Longitudinal trim is maintained by controlling the rotation of the elevons 120 about their hinges 122, the rotation of the control fins 112 about a lateral axis as shown in FIG. 2, or the rotation of the elevators 108 on the wings 106, or combinations of the foregoing.

Whenever the control system 118 must maneuver the vehicle 100 in a lateral direction, it causes the rotatable section 110 to rotate about the longitudinal axis 116 through an angle $\phi$. The angle $\phi$ is determined by the desired rate of turning and is measured with respect to the initial orientation of the control fins 112, which is parallel to the ground during level flight. As illustrated in FIG. 4, the control fins 112 provide a lift force perpendicular to their surfaces of magnitude L determined by their aerodynamic surface geometry and independent of the angle $\phi$. Referring to FIG. 4, the vertical component $L_z$, of the lift force (i.e., the component perpendicular to the ground during level flight) is given by $L_z = L \cos \phi$. The horizontal component $L_y$ of the lift force is given by $L_y = L \sin \phi$. Thus, during level flight, the lateral moment imparted by the control fins 112 increases at the expense of the pitching moment imparted by the control fins 112, unless other measures are taken.

To prevent such a loss of pitch moment and maintain longitudinal trim, the total force L is increased. This is accomplished either by rotating the elevons 120 about the hinges 122 to increase their deflection angle or by rotating the entire control fin 112 about a lateral axis to increase its angle of attack, as illustrated in FIG. 2. Alternatively, or in addition to the modulation of the incidence of the control fins 112, the control system 118 may rotate the elevators 108 to maintain longitudinal trim.

Figure 6:
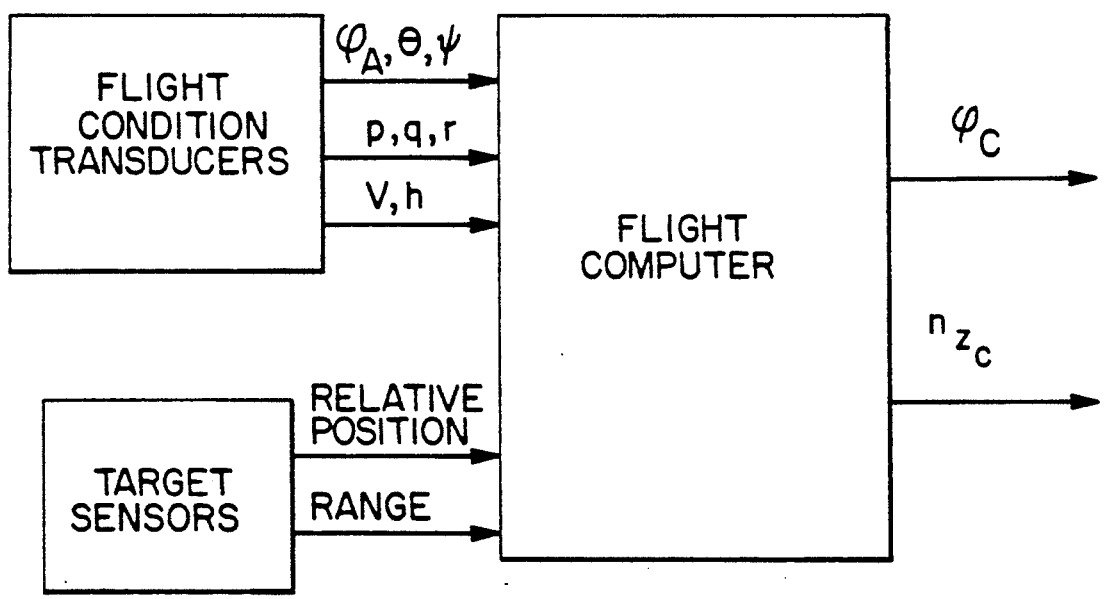
FIG. 6 is a schematic diagram of the flight control computer system of the vehicle and the input and outputs thereto as pertaining to the control fins (surfaces) and actuators of FIGS. 1-5.

The output from the flight computer to the separately banking maneuvering control inner control loops consists of commanded canard rotation angle and maneuvering load factor (as illustrated in FIG. 6) which are supported by means programming said flight computer to output a relative control surface roll angel command and a maneuver load factor command.

Figure 7:
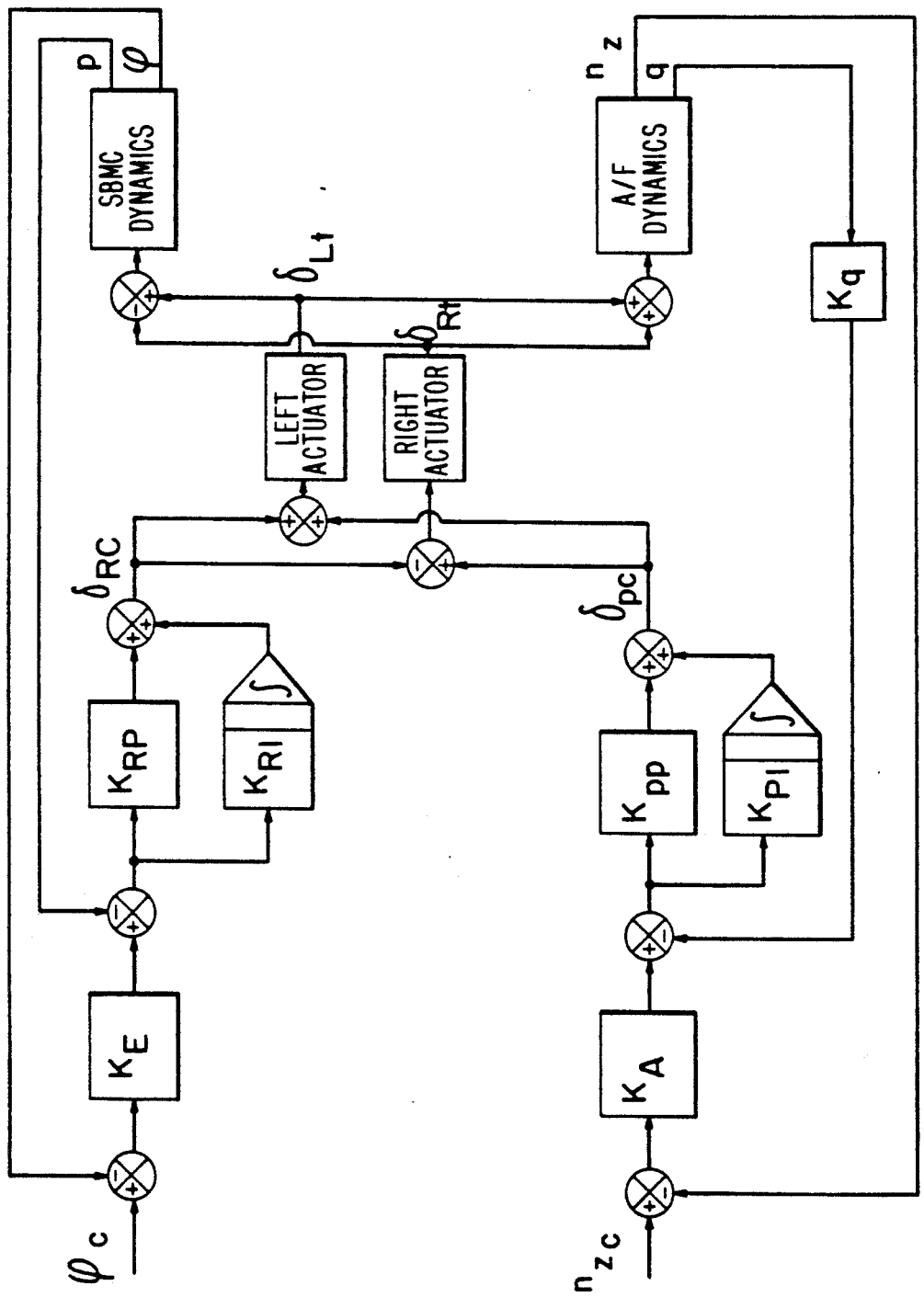
FIG. 7 is a schematic diagram of the feedback control circuit which converts the control outputs from the flight computer into actuator inputs in accordance with the present invention.

The inner control loop block diagrams are illustrated in FIG. 7 which shows a representative diagram of relative angle control and the pitch control loop and includes feed-back control circuit means responsive to said relative roll attitude command and to said maneuver load factor command for converting said commands into position command inputs to said actuators, by which said actuators are controlled to provide differential (rotation angle) and symmetrical (pitch) actions.

The commands generated to the left and right canard control actuators are derived from these two command outputs as follows:

$$\delta_{cLt} = \delta_{pc} + \delta_{Rc}$$

$$\delta_{CRt} = \delta_{pc} - \delta_{Rc}$$

Referring now to FIG. 7 specifically, the typical rotation feedback loop applies a position error gain ($K_E$) to the difference between the measured and commanded canard rotation angle ($\phi$ and $\phi_C$). A damping gain $K_{RP}$ acts to wash out control input as the rotation rate increases. A foreword integrator $K_{RI}$ is used to integrate rotation rate to produce a canard rotation command ($\delta_{RC}$).

This same logic is used to convert the commanded maneuvering load factor to a commanded pitch control deflection $\delta_{pc}$.

The pitch and relative angle commands are combined to the left and right actuators. The commands are additive to the left actuator. The right actuator input is the difference between the pitch and relative rotation commands.

The movement of the control actuators move the left and right surfaces such that a differential deflection produces a control surface rotation rate about the vehicle longitudinal axis and a symmetrical deflection produces lift on the control which imparts a pitching moment to the vehicle, increasing its angle of attack. The increased lift resulting from the angle of attach increase will produce a maneuvering load factor which is fed back into the control loop, which will produce increased control deflection until the commanded load factor ($n_{zc}$) is attained.

The commanded relative orientation of the SBMC canard is programmed to provide a lift force toward the target, as illustrated in FIG. 4, at the same time it imparts a moment to the body of the flight vehicle to alter its flight path toward the target. Other lifting surfaces, as illustrated in FIG. 1 (106 and 104), and control surfaces (108) may be oriented by means of additional commands from the flight computer to enhance the maneuvering capability and target acquisition in an optimum manner. The design and control of these additional lifting surfaces will enhance the effectiveness of the SBMC, but are outside the scope of the present disclosure.

While the control surfaces 112 are illustrated in the accompanying drawings as being vertically located at the height of the centerline 116 of the flight vehicle body 102, in fact the control surfaces 112 can be mounted at any vertical location on the body 102, either above or below the height of the centerline 116.

Although the SBMC design has been conceived for application to the maneuvering control of weapons, there is nothing inherent in the design to preclude its application to manned aircraft. In a manned aircraft application additional inputs from the pilots controls would be fed into the flight computer.

While the invention has been described in detail by specific reference to preferred embodiments, it is understood that variations and modifications thereof may be made without departing from the true spirit and scope of the invention.

What is claimed is:

1. A maneuvering control system for a flight vehicle extending fore and aft along a longitudinal axis about which the vehicle assumes a roll attitude, said vehicle having a flight computer, comprising:
   means forming a forward section of said vehicle which is free to rotate about said longitudinal axis independently of said roll attitude,
   means forming control surfaces mounted from said section to extend outwardly therefrom along a lateral axes generally on opposite sides of said section,
   means for independently changing the attitude of said control surfaces about said lateral axes to control the roll attitude of said section and to obtain a desired change in direction of flight including:
   actuators connected to said control surfaces for changing the relative attitude of the control surfaces by differential deflection in which said surfaces move counter to each other, and by symmetrical deflection in which said surfaces move in the same direction,
   the attitudes of said surfaces being actuated independently so that differential deflection controls the rotation orientation of said section, and symmetrical deflection produces a pitching moment to the vehicle in the direction of the collective surface orientation,
   means programming said flight computer to output a relative control surface roll angle command and a maneuver load factor command, and
   feed-back control circuit means responsive to said relative roll attitude command and to said maneuver load factor command for converting said commands into position command inputs to said actuators, by which said actuators are controlled to provide differential (rotation angle) and symmetrical (pitch) actions.

2. The steering system of claim 1 wherein said control surfaces comprise a pair of parallel generally flat planar surfaces extending outward and externally of said flight vehicle in opposite directions on opposite sides thereof along said lateral axis.

3. The steering system of claim 2 wherein said pair of surfaces have an aerodynamic cross-sectional shape providing lift during flight.

4. The steering system of claim 1 wherein said section comprises a pair of concentric rings, one of said rings being fixed with respect to said flight vehicle and the other being attached to and rotatable about said longitudinal axis with said control surfaces, and wherein said steering system comprises:
   means for rotating at least portions of said surfaces about an axis generally perpendicular to said longitudinal axis in opposite directions whereby to create a differential lift across said other ring so as to rotate it with respect to said one ring.

5. A maneuvering control method for a flight vehicle extending fore and aft along a longitudinal axis about which the vehicle assumes a roll attitude, said vehicle having a flight computer, comprising the steps of:
   forming a forward section of said vehicle which is free to rotate about said longitudinal axis independently of said roll attitude,
   forming control surfaces mounted from said section to extend outwardly therefrom along a lateral axes generally on opposite sides of said section, independently changing the attitude of said control surfaces about said lateral axes to control the roll attitude of said section and to obtain a desired change in direction of flight including:

changing the relative attitude of the control surfaces by differential deflection in which said surfaces move counter to each other, and by symmetrical deflection in which said surfaces move in the same direction, said changing step actuating said surfaces independently so that differential deflection controls the rotation orientation of said section, and symmetrical deflection produces a pitching moment to the vehicle in the direction of the collective surface orientation, programming said flight computer to output a relative control surface roll angle command and a maneuver load factor command, and converting said commands into position command inputs to said actuators, by which said actuators are controlled to provide differential (rotation angle) and symmetrical (pitch) actions.

* * * * *